United States Patent
Ito

(10) Patent No.: US 9,199,614 B2
(45) Date of Patent: Dec. 1, 2015

(54) METHOD AND APPARATUS FOR REDUCING COLLISION INJURY/DAMAGE OF VEHICLES

(75) Inventor: Yosuke Ito, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 136 days.

(21) Appl. No.: 12/927,678

(22) Filed: Nov. 19, 2010

(65) Prior Publication Data

US 2011/0125372 A1 May 26, 2011

(30) Foreign Application Priority Data

Nov. 20, 2009 (JP) ................................. 2009-264843

(51) Int. Cl.
| | |
|---|---|
| *G05B 13/02* | (2006.01) |
| *B60T 7/22* | (2006.01) |
| *B60R 21/013* | (2006.01) |
| *B60R 21/0134* | (2006.01) |
| *B60W 30/09* | (2012.01) |
| *B60W 30/095* | (2012.01) |
| *B60R 21/0132* | (2006.01) |
| *B60R 21/00* | (2006.01) |

(Continued)

(52) U.S. Cl.
CPC ................. *B60T 7/22* (2013.01); *B60R 21/013* (2013.01); *B60R 21/0134* (2013.01); *B60W 30/09* (2013.01); *B60W 30/095* (2013.01); *B60R 21/0132* (2013.01); *B60R 2021/003* (2013.01); *B60R 2021/0027* (2013.01); *B60R 2021/01259* (2013.01); *B60R 2021/01327* (2013.01); *B60T 2201/024* (2013.01); *B60W 10/184* (2013.01)

(58) Field of Classification Search
CPC .............. B60R 21/013; B60R 21/0132; B60R 21/0134; B60R 2021/0027; B60R 2021/01327; B60R 2021/01322; B60R 2021/003; B60T 7/22
USPC ....................................... 701/45, 301, 302, 46
See application file for complete search history.

(56) References Cited

U.S. PATENT DOCUMENTS

| | | | | |
|---|---|---|---|---|
| 5,999,871 | A | * | 12/1999 | Liu ................................. 701/45 |
| 6,301,535 | B1 | * | 10/2001 | Nusholtz et al. ................ 701/45 |
| 7,250,850 | B2 | * | 7/2007 | Mizutani ....................... 340/435 |

(Continued)

FOREIGN PATENT DOCUMENTS

| | | |
|---|---|---|
| JP | 2004-058794 | 2/2004 |
| JP | 2004-189078 | 7/2004 |

(Continued)

*Primary Examiner* — Thomas G Black
*Assistant Examiner* — Sze-Hon Kong
(74) *Attorney, Agent, or Firm* — Harness, Dickey & Pierce, P.L.C.

(57) ABSTRACT

An on-vehicle apparatus is provided to reduce damage from collisions. In the apparatus, an object located in a field in a travel direction of a vehicle is detected and a time to collision (TTC) is detected. A controller performs automatic intervention braking in the vehicle when it determined that the time to collision is equal to or shorter than a first threshold time. Further, when it determined that the time to collision is equal to or shorter than a second threshold time shorter than the first threshold time and meets a preset actuation condition, a protection controller makes a protection device active for vehicle protection. A collision speed is also estimated based on an deceleration of the vehicle caused by the automatic intervention braking. The preset actuation condition is a condition that the estimated collision speed is equal to or higher than a preset threshold speeds.

7 Claims, 5 Drawing Sheets

(51) Int. Cl.
*B60R 21/01* (2006.01)
*B60W 10/184* (2012.01)

(56) References Cited

U.S. PATENT DOCUMENTS

| | | | | |
|---|---|---|---|---|
| 7,262,710 | B2* | 8/2007 | Watanabe et al. | 340/903 |
| 7,552,031 | B2* | 6/2009 | Vock et al. | 702/188 |
| 7,729,859 | B2* | 6/2010 | Kimura et al. | 701/301 |
| 7,786,926 | B2* | 8/2010 | Hilsebecher et al. | 342/72 |
| 7,904,246 | B2* | 3/2011 | Kondoh et al. | 701/301 |
| 7,954,587 | B2* | 6/2011 | Kisanuki et al. | 180/274 |
| 7,996,133 | B2* | 8/2011 | Wang | 701/46 |
| 8,150,583 | B2* | 4/2012 | Danner et al. | 701/45 |
| 8,155,853 | B2* | 4/2012 | Wang | 701/70 |
| 8,554,461 | B2* | 10/2013 | Cuddihy et al. | 701/301 |
| 2007/0228705 | A1* | 10/2007 | Rao et al. | 280/735 |
| 2008/0269991 | A1* | 10/2008 | Yamashita | 701/45 |
| 2008/0269997 | A1* | 10/2008 | Ezoe et al. | 701/70 |
| 2008/0291078 | A1* | 11/2008 | Hilsebecher et al. | 342/70 |
| 2009/0024282 | A1 | 1/2009 | Roehm et al. | |
| 2009/0210114 | A1* | 8/2009 | Baumann et al. | 701/45 |
| 2010/0241329 | A1* | 9/2010 | Fujimura | 701/70 |
| 2010/0250085 | A1* | 9/2010 | Sugano et al. | 701/70 |
| 2011/0044507 | A1* | 2/2011 | Strauss et al. | 382/103 |

FOREIGN PATENT DOCUMENTS

| | | |
|---|---|---|
| JP | 2005-022647 | 1/2005 |
| JP | 2008-030667 | 2/2008 |
| JP | 2008-521691 | 6/2008 |
| JP | 2009-107622 | 5/2009 |

* cited by examiner

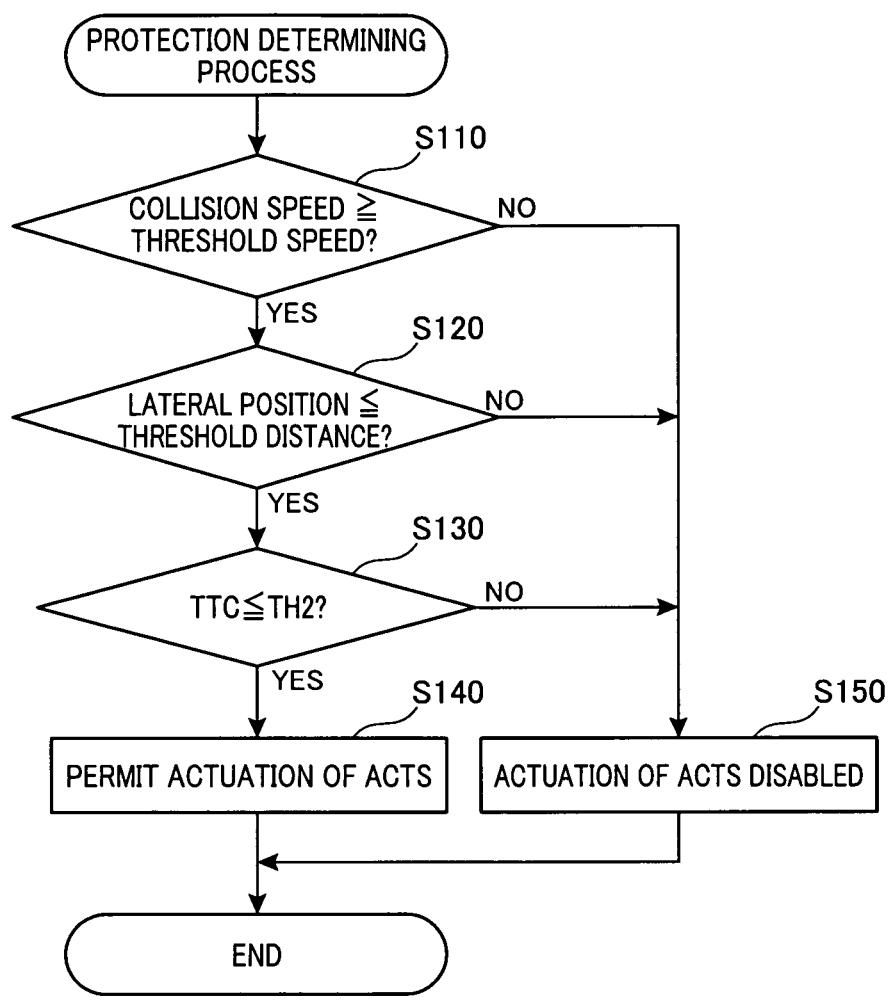

METHOD AND APPARATUS FOR REDUCING COLLISION INJURY/DAMAGE OF VEHICLES

CROSS-REFERENCE TO RELATED APPLICATION

This application is based on and claims the benefit of priority from earlier Japanese Patent Application No. 2009-264843 filed Nov. 20, 2009, the description of which is incorporated herein by reference.

BACKGROUND

1. Technical Field

This application is related to a method and apparatus for reducing injury/damage from collisions of a vehicle with other vehicles, obstacles, or pedestrians, and in particular, to such a method and apparatus that are operable based on a time factor called "a time to collision (TTC)".

2. Related Art

Vehicle control units that perform vehicle control according to a probability of collision have been known. In such a vehicle control unit, a monitoring sensor, such as a radar or a camera, included in the vehicle control unit is used to sense an obstacle or a pedestrian (hereinafter collectively referred to as an "object") located in a travel direction of the vehicle equipped with the unit (hereinafter also referred to as "the vehicle concerned" or just as "the vehicle" when comprehensible from the context). After an object is sensed, a time to collision (TTC) is calculated by dividing a relative distance between the object and the vehicle by a relative speed. Vehicle control according to a probability of collision between the object and the vehicle has been performed based on the TTC calculated as mentioned above.

As an example of such vehicle control units, collision injury/damage reduction apparatuses have been known. In such a collision injury/damage reduction apparatus, a probability of collision is determined to be high when the TTC becomes equal to a predetermined first threshold time TH1. When such a determination is made, an automatic braking system is forcibly operated irrespective of the driver's operation of the vehicle. Further, when the TTC becomes equal to a second threshold time TH2 (<TH1), a probability of collision is determined to be higher. In this case, protection devices provided at the vehicle are actuated to reduce injuries and damage that would be caused by the possible collision.

It sometimes happens that such a collision injury/damage reduction apparatus allows the protection devices to be actuated under the condition where there is no need of such an actuation (or allow a so-called erroneous actuation). In order to avoid such an erroneous actuation, it has been suggested that certain conditions of actuation be given and that the protection devices be actuated only when the conditions of actuation have been met. The conditions of actuation include, for example, that a relative speed used for the calculation of the TTC should be equal to or more than a threshold speed even when the TTC has become equal to the second threshold time TH2. Reference may be made, for example, to JP-A-2008-521691 for such a suggestion.

However, such a conventional collision injury/damage reduction apparatus makes a determination regarding whether or not the protection devices should finally be actuated, with reference to the relative speed prior to the time point of the determination. Meanwhile, the vehicle concerned may be decelerated by an automatic braking system to a level that the possible collision between an object, such as a pedestrian, and the vehicle would cause no injuries to the pedestrian or the vehicle occupants involved in the collision, or to a level of avoiding the collision. For this reason, it is very likely that the protection devices may be actuated when they are no longer needed to be actuated.

Specifically, for the sake of safety, it is required that a threshold speed be preset estimating a relative speed of collision between an object and the vehicle concerned. Meanwhile, it is difficult to change a preset threshold speed, for the purpose of reducing erroneous actuation of the protection devices. Therefore, a threshold-based determination (hereinafter referred to "threshold determination") by merely comparing the relative speed before collision with the threshold speed, as has been conducted in the conventional art, will not reflect the change of the relative speed on or after the time point when the TTC becomes equal to the second threshold time TH2. As a result, the accuracy of a threshold determination tends to become comparatively low.

SUMMARY

In order to solve the problem set forth above, an embodiment provides a collision injury/damage reduction apparatus which is able to highly accurately determine, immediately before the collision between an object and the vehicle equipped with the unit, regarding whether or not protection devices should be actuated.

According to a first aspect of the embodiment, the collision injury/damage reduction apparatus includes object sensing means that senses an object located in a travel direction of the vehicle equipped with the collision injury/damage reduction apparatus (hereinafter also referred to as "the vehicle concerned" or just as "the vehicle" when comprehensible from the context). The collision injury/damage reduction apparatus of the embodiment also includes time calculating means that calculates a time to collision (TIC) that is a ratio of a relative speed to a relative distance between an object and the vehicle concerned (i.e. a value derived by dividing a relative distance by a relative speed).

When a TTC calculated by the time calculating means is equal to or less than a preset first threshold time, automatic braking means carries out automatic intervention braking of the vehicle. When the TTC is equal to or less than a second threshold time (which is preset to a value smaller than the first threshold time) and meets predetermined conditions of actuation, protective actuating means actuates protection devices (devices installed in the vehicle in order to reduce injuries and damage caused by the collision between the vehicle and an object).

The term "first threshold time" refers to a time preset assuming a condition where a probability of collision (hereinafter referred to as "collision probability") between an object and the vehicle concerned is at a high level at which a collision with the object is unavoidable irrespective of the driver's operation of the steering wheel. The term "second threshold time" refers to a time preset assuming a condition where a collision probability is at a level higher than that of the first threshold time. It should be appreciated that the first threshold time and the second threshold time are both drawn out, such as from various experimental data, on the presumption that a relative speed between an object and the vehicle concerned can only change at a certain level.

In the collision injury/damage reduction apparatus of the embodiment, speed estimating means estimates a collision speed V that is a relative speed of collision between an object and the vehicle concerned, based on a deceleration of the vehicle caused by the automatic intervention braking (hereinafter also referred to as an "automatic braking system"). When the collision speed V estimated by the speed estimating means is equal to or more than a preset threshold speed, the protective actuating means determines that the conditions of actuation have been met.

Specifically, the collision injury/damage reduction apparatus of the embodiment the relative speed also continues changing on or after the time point when the TTC has become equal to the second threshold time (specifically, the relative speed of the vehicle to the object will be reduced). In the embodiment, a relative speed (collision speed V) is estimated at a time when the TTC has become equal to the second threshold time. The collision speed V is then compared with the threshold speed to make a threshold determination regarding whether or not the conditions of actuation have been met.

Thus, according to the collision injury/damage reduction apparatus of the embodiment, change of the relative speed at the time point when the TTC has become equal to the second threshold time is reflected in the threshold determination. Therefore, the results of the threshold determination match the actual behavior (travel status) of the vehicle. Further, a highly accurate determination can be made, immediately before the possible collision between an object and the vehicle, regarding whether or not the protection devices should be actuated. In this way, erroneous actuation of the protection devices is reduced.

The collision speed V may be calculated from the following Formula (1):

$$V = V_0 + \alpha \cdot TTC \quad (1)$$

where $V_0$ is a relative speed (before collision) based on the results of the detection of the object sensing means, $\alpha$ ($\alpha < 0$) is a deceleration of the vehicle concerned caused by the automatic intervention braking, and TTC is a time to collision, as mentioned above. In this formula, $V_0$ is regarded to be an initial speed.

It should be appreciated that the TTC is calculated on the presumption that the relative speed remains unchanged at the initial speed $V_0$. Accordingly, the collision speed V calculated using such a TTC may include a large error in the case where the relative speed has changed significantly before an actual collision.

To cope with this, it is preferable, as is drawn from a second aspect of the embodiment, that the collision speed V be estimated by the speed estimating means through a calculation using a relation as expressed by the following Formula (2):

$$V^2 - V_0^2 = 2\alpha X_0 \quad (2)$$

where $X_0$ is a relative speed based on the results of the detection of the object sensing means. The above Formula (2) is derived from the following Formulas (3) and (4) by eliminating the time T before the actual occurrence of a collision, on the presumption that the relative speed changes due to the operation of the automatic braking system:

$$V = V_0 + \alpha T \quad (3)$$

$$X_0 = V_0 T + \alpha T^2 / 2 \quad (4)$$

where T is a time taken before the occurrence of an actual collision.

In this way, the collision speed V is calculated from the Formula (2) without using a TTC which may include a large error. Accordingly, comparing with the case where the Formula (1) is used, the reliability of the collision speed V is enhanced, and further, the accuracy of the determination made by the protective actuating means is more enhanced.

In the collision injury/damage reduction apparatus of the embodiment, a requested value set in performing the automatic intervention braking may be used as the deceleration "α" of the vehicle caused by the automatic intervention braking.

However, as is drawn from a third aspect of the embodiment, it is preferable that the apparatus further comprises an acceleration detector that detects an acceleration of the vehicle, wherein the speed estimator is configured to estimate the collision speed based on the deceleration estimated from a result detected by the acceleration detector.

In the latter case, the deceleration (which is an actual measurement value) actually caused to the vehicle by the automatic intervention braking is reflected in the collision speed V. Accordingly, when the actual measurement value of the deceleration is deviated from a requested value due to the road surface conditions, for example, a collision speed that matches the actual travel status can be calculated. Thus, compared to the former case, the reliability of the collision speed V is enhanced, and further, the accuracy of the determination made by the protective actuating means is more enhanced.

It is also preferred that the speed estimator is configured to estimate the collision speed at first intervals and the time estimator is configured to estimate the time to collision at second intervals, the first intervals being shorter than the second intervals.

According to the collision injury/damage reduction apparatus configured in this way, the collision speed V can be estimated a plurality of times during a period from the time point when the TTC becomes equal to the first threshold time until the TTC becomes equal to the second threshold time. Therefore, a precise determination is made regarding whether or not the conditions of actuation have been met, at the time point when the TTC becomes equal to the second threshold time. In addition, unnecessary control processes can be omitted because the estimation of the collision speed has to be only started from the time point when the TTC becomes equal to the first threshold time.

The protection devices may be devices for protecting the vehicle occupants (e.g., airbags and seatbelt take-up devices for vehicle occupants), or may, for example, be devices for protecting pedestrians (e.g., airbags for pedestrians, pop-up hood and active grille). Alternatively, the protection devices may be limited to those devices operable in a reversible manner, as can be drawn from a fifth aspect of the embodiment.

Specifically, the protection devices operable reversibly can dispense with the reinstallation of new protection devices, should the protection devices be actuated when unwanted. Thus, cost is advantageously reduced.

In the collision injury/damage reduction apparatus of the embodiment, collision measuring means measures a physical value for detecting the collision between the vehicle concerned and an object. Thus, the protection devices may be those which are operable in an irreversible manner, on condition that the physical value measured by the collision measuring means is equal to or more than a reference physical value for indicating a collision between the vehicle and the object. In this case, the collision injury/damage reduction apparatus of the embodiment may include actuation permitting means. The actuation permitting means permits the protective actuating means to actuate the protection devices only when the physical value measured by the collision measuring means is equal to or more than a physical threshold which is preset to a value smaller than the reference physical value.

According to the collision injury/damage reduction apparatus configured in this way, a threshold determination regarding actuation can be made also for the protection devices which are normally actuated at the time of the occurrence of a collision, using a physical threshold smaller than a normal threshold (reference physical value), provided that predetermined conditions of actuation, for example, have been met. In this way, the timing of actuation of the protection devices can be put forward under the conditions where the injuries and damage that would be caused by a collision are expected to be large.

BRIEF DESCRIPTION OF THE DRAWINGS

In the accompanying drawings:

FIG. 3 is a flow diagram specifically illustrating a process of a second determination section (protection determining process), which process is performed by a control unit, according to the embodiment;

DETAILED DESCRIPTION OF THE PREFERRED EMBODIMENTS

With reference to the accompanying drawings, hereinafter are described an embodiment and modifications of the present invention.

With reference to FIGS. 1-5, an embodiment of a method and apparatus for reducing collision injury/damage of vehicles, which is according to the present invention, will now be described.

Figure 1:
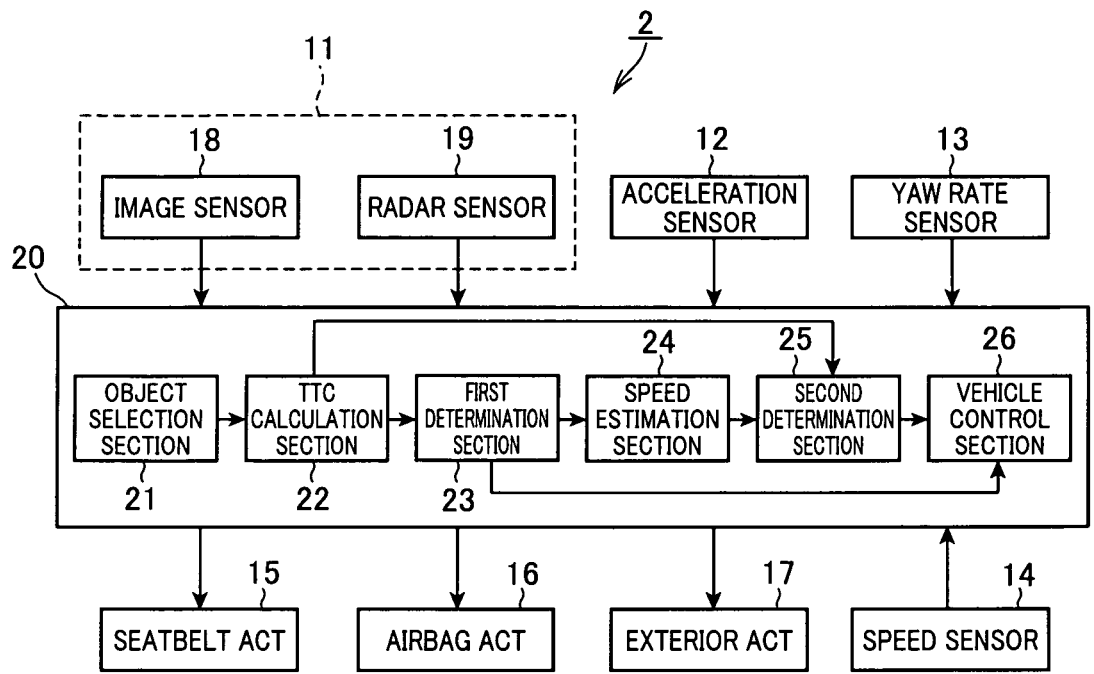
FIG. 1 is a block diagram illustrating a configuration of a collision injury/damage reduction apparatus according to an embodiment of the present application.
Figure 2:
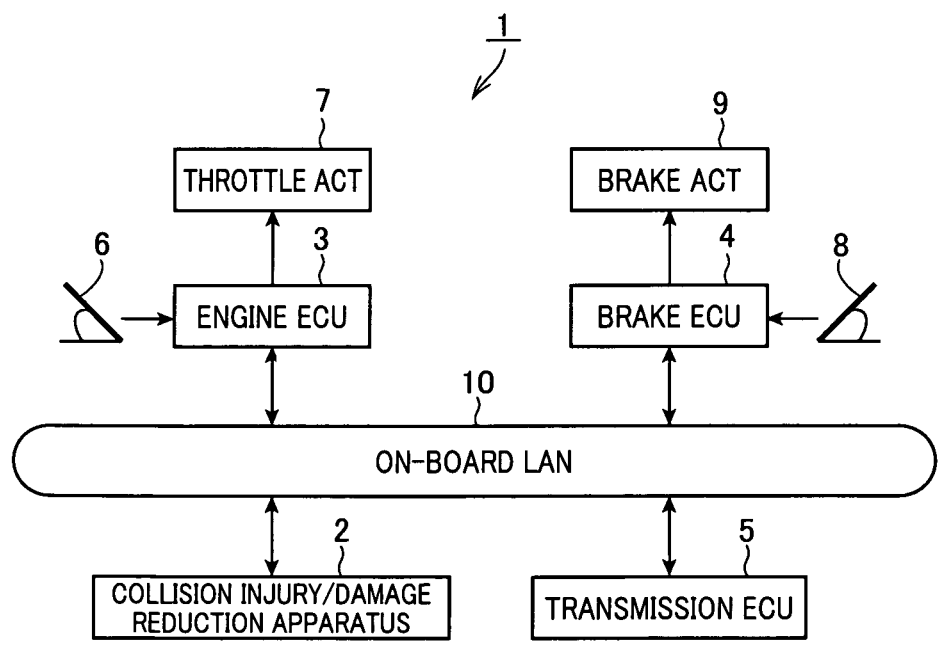
FIG. 2 is a block diagram illustrating a general configuration of an on-board system provided with the collision injury/damage reduction apparatus of the embodiment.

FIG. 1 is a block diagram illustrating a configuration of a collision injury/damage reduction apparatus 2 according to the embodiment, in which the apparatus 2 is carried out as the apparatus according to the present invention. FIG. 2 is a block diagram illustrating a general configuration of an on-board system 1 provided with the collision injury/damage reduction apparatus 2.

As shown in FIG. 2, besides the collision injury/damage reduction apparatus 2, the on-board system 1 includes an engine ECU 3, a brake ECU 4 and a transmission ECU 5. The engine ECU 3 serves as an electronic control unit (control system ECU) associated with cruise control of a vehicle to control engine start/stop, fuel injection quantity, ignition timing, and the like. The brake ECU 4 plays a role of controlling braking of a vehicle. The transmission ECU 5 plays a role of controlling an automatic transmission. As shown in FIG. 2, these units 2 to 5 are connected to an on-board LAN (local area network) 10.

The on-board system 1 also includes an inter-vehicle control ECU (not shown) that controls an inter-vehicle distance that is a distance between a preceding vehicle and the vehicle equipped with the on-board system 1 (hereinafter also referred to as "the vehicle concerned" or just as "the vehicle" when comprehensible from the context). The ECUs 3 to 5 receive data associated with target acceleration from the inter-vehicle control ECU via the on-board LAN 10. The ECUs 3 to 5 also receive, via the on-board LAN 10, data associated with target deceleration, acceleration (or deceleration) gradient, and the like, as well as commands (information), as will be described later. The ECUs 3 to 5 are configured to control the engine, the brake and the automatic transmission upon reception of these data and information so that an operation status specified by the received data and information are realized.

Of the ECUs 3 to 5, the engine ECU 3 includes an accelerator depression sensor 6 and a throttle actuator (hereinafter, the term "actuator" is referred to as "ACT") 7. The accelerator depression sensor 6 senses an amount of depression of an accelerator pedal. The throttle ATC 7 opens/closes a throttle, which is disposed at an intake pipe, by an angle corresponding to a detection value derived from the accelerator depression sensor 6. The engine ECU 3 is configured to output an actuation command to the throttle ATC 7, for example, according to the operation status specified by the data and information received from the collision injury/damage reduction apparatus 2 and other ECUs to thereby control the driving force of an internal combustion engine.

The brake ECU 4 includes a brake depression sensor 8 and a brake ACT 9. The brake depression sensor 8 senses an amount of depression of a brake pedal. The brake ACT 9 opens/closes a pressure-increase control valve and a pressure-decrease control valve provided at a brake fluid pressure circuit, by an angle corresponding to a detection value derived from the brake depression sensor 8. The brake ECU 4 is configured to change a set value of the brake fluid pressure for an amount of depression of the brake pedal or to forcibly actuate an automatic braking system, based on the data and information received from the collision injury/damage reduction apparatus 2 and other ECUs via the on-board LAN 10.

As shown in FIG. 1, the collision injury/damage reduction apparatus 2 includes a monitoring sensor 11, an acceleration sensor 12, a yaw rate sensor 13, a speed sensor 14, a seatbelt ACT 15, an airbag ATC 16, exterior ACTs 17 and a control unit 20.

The monitoring sensor 11 senses an object located in a travel direction of the vehicle concerned. The acceleration sensor 12 senses acceleration applied to the vehicle in a longitudinal direction thereof. The yaw rate sensor 13 senses angular velocity in a direction in which the vehicle turns. The speed sensor 14 senses travel speed (vehicle speed) of the vehicle. The seatbelt ACT 15 actuates a take-up device (pretensioner) that gives a tensile force to the seatbelt. The airbag ACT 16 deploys the airbag provided at each seat of the vehicle. The exterior ACTs 17 actuate respective exterior parts provided at the vehicle in order to reduce injuries and damage caused by the collision between a pedestrian and the vehicle. The control unit 20 performs processes in response to the inputs from the sensors 11 to 14, actuates the ATCs 15 to 17, and outputs commands and data to the ECUs 3 to 5 via the on-board LAN 10.

The monitoring sensor 11 includes an image sensor 18 and a radar sensor 19. The image sensor 18 picks up an image of a landscape (including the travel road) in a forward direction of the vehicle to output data of the image. The radar sensor 19 senses an object located in a predetermined sensing range in a forward direction of the vehicle.

The radar sensor 19 is configured as a so-called "millimeter-wave radar" based on the FMCW technique. The radar sensor 19 is configured to sense objects, such as other vehicles, obstacles and pedestrians (hereinafter also referred to as "forward obstacles"), in a forward direction of the vehicle by transmitting and receiving frequency-modulated radar waves in a millimeter-wave band. Based on the detection results, the radar sensor 19 prepares target information associated with the forward obstacles and outputs the target information to the control unit 20.

When the radar sensor 19 can detect a certain forward obstacle, the target information at least includes a relative speed between the forward obstacle and the vehicle concerned, and position information (information on a relative distance and direction) of the forward obstacle. On the other hand, when the radar sensor 19 cannot recognize a certain forward obstacle, the target information indicates accordingly. The direction information here of a forward obstacle is indicated in terms of an angle between a line, including the center of the vehicle, extended in a forward direction of the vehicle and the position of the forward obstacle.

The exterior ACTs 17 actuate respective protection devices as exterior parts, not shown, such as a known pop-up hood, an active grille and hood airbags, so that the impact such as on the head and legs of a pedestrian involved in the collision can be mitigated.

For example, the pop-up hood is a device which is actuated to lift up a rear side of an engine hood to form a space between the engine and the hood. The active grille is a device which is actuated to thrust forward a radiator grille disposed between the left and right headlights to form a space such as between a radiator and the radiator grille. Thus, the pop-up hood and the active grille are provided to reduce the impact on the pedestrian involved in the collision, which impact would be caused by the hard-material engine, radiator and the like.

The control unit 20 includes an object selection section 21, a time to collision (TTC) calculation section 22, a first determination section 23, a speed estimation section 24, a second determination section 25 and a vehicle control section 26.

The object selection section 21 selectively determines which of vehicle, obstacle and pedestrian, for example, an object sensed by the radar sensor 19 corresponds to, by subjecting the image data inputted from the image sensor 18 to a known image recognition process. The TTC calculation section 22 calculates a TTC which will be described later. The first determination section 23 determines whether or not automatic intervention braking of the vehicle should be performed, based on the results of the calculation of the TTC calculation section 22. The speed estimation section 24 estimates a collision speed, which will be described later, based on a deceleration of the vehicle caused by the automatic intervention braking. The second determination section 25 determines whether or not the protection devices should be actuated, based on the results of the calculation of the TTC calculation section 22 and the results of the estimation of the speed estimation section 24. The vehicle control section 26 performs vehicle control based on the results of the determinations made by the first and second determination sections 23 and 25.

The object selection section 21, TTC calculation section 22, first determination section 23, speed estimation section 24, second determination section 25 and vehicle control section 26 are all realized in terms of respective processes periodically performed by a known microcomputer having a CPU, ROM, RAM, EEPROM, DSP (digital-analog processor), and the like.

Of these sections, the object selection section 21 not only selects an object but also calculates a forecast travel trajectory of the vehicle in the case where the vehicle moves along a travel lane, maintaining the speed and the yaw rate of the moment, based on the results of the detections derived from the speed sensor 14 and the yaw rate sensor 13, and the image data derived from the image sensor 18. Further, the object selection section 21 extracts objects located at positions of which distance from the forecast travel trajectory falls in a predetermined range, based on the target information derived from the radar sensor 19. The types of the objects extracted by the object selection section 21 are stored in the RAM.

The TTC calculation section 22 calculates a time to collision (TTC) that is the ratio of a relative distance between each object extracted by the object selection section 21 and the vehicle concerned, to a relative speed. The ratio is calculated by dividing a relative distance by a relative speed. The TTC calculation section 22 then stores the calculated TTCs in the RAM after correlating the TTCs with the types of objects extracted by the object selection section 21.

The first determination section 23 determines the level of a probability of collision (hereinafter referred to as "collision probability") between each object extracted by the object selection section 21 and the vehicle concerned, based on the TTC calculated by the TTC calculation section 22, and stores a determination flag in the RAM (flag is set to "1"), the flag indicating the results of the determination.

Specifically, if the TTC is equal to or less than a preset first threshold time TH1, the level of a collision probability is determined to be a third level that requires forcible actuation of the automatic braking system (execution of the automatic intervention braking) irrespective of the driver's operation. The determination flag is prepared for each level of collision probability.

The term "third level" refers to a level at which the collision probability is high between an object and the vehicle, i.e. a level at which the collision with the object is unavoidable, irrespective of the driver's steering-wheel operation. The term "first threshold time TH1" refers to a time which is preset assuming the conditions of the third level.

Besides the third level and a fourth level, which will be described later, the levels of collision probability in the present embodiment include a first level at which an audible warning or the like is required to be given, and a second level at which the driver's braking operation is required to be assisted.

When the level of a collision probability is determined to be the third level by the first determination section 23, the speed estimation section 24 estimates a collision speed that is a relative speed of the collision between an object and the vehicle concerned, based on the target information derived from the radar sensor 19 and the deceleration (the acceleration sensed by the acceleration sensor 12 in the present embodiment) of the vehicle resulting from the automatic intervention braking.

Specifically, a collision speed V is calculated using a relation expressed by the following Formula (I):

$$V - V_0^2 = 2\alpha X_0 \qquad (I)$$

where $V_0$ and $X_0$ indicate a relative speed and a relative distance, respectively, contained in the target information, and $\alpha$ ($\alpha<0$) indicates a deceleration of the vehicle resulting from the automatic intervention braking. In the Formula (I), $V_0$ is regarded to be an initial speed. If the value of the collision speed V results in a complex number, the real part alone is regarded to be the collision speed.

Each collision speed V estimated here is stored in the RAM, being correlated to the TTC calculated by the TTC calculation section 22. In the present embodiment, the estimation cycle of the collision speed in the speed estimation section 24 is set to be shorter than the calculation cycle of the TTC in the TTC calculation section 22. In other words, in the RAM, data showing a plurality of collision speeds are stored being correlated to a single TTC.

The vehicle control section 26 performs vehicle control according to the level of a collision probability, based on the determination flag stored in the RAM. Specifically, when the level of a collision probability is the first level, an audible warning is given, or warning torque is caused at the steering wheel. When the level of a collision probability is the second level, a command is issued to the brake ECU 4 via the on-board LAN 10, so that a set value of the brake fluid pressure is increased with respect to the amount of depression of the brake pedal.

When the level of a collision probability is the third level, a command for forcibly actuating the automatic braking system irrespective of the driver's operation, as well as data, such as a target deceleration (e.g. $-5$ m/s$^2$) and deceleration gradient (e.g., $-20$ m/s$^2$), is transmitted to the brake ECU 4 and the engine ECU 3 via the on-board LAN 10. At the same time, an actuation signal for actuating pretensioners (seatbelt take-up devices) is outputted to the seatbelt ACT 15.

Also, when the level of a collision probability is the fourth level, the vehicle control section 26 is ensured to output an actuation signal for actuating the airbags in the vehicle cabin to the airbag ATC 16. At the same time, when the type of an object stored in the RAM indicates a pedestrian, the vehicle control section 26 is ensured to output an actuation signal to actuate the active grille, the pop-up hood and the hood airbags (airbags for pedestrians).

Referring now to FIG. 3, hereinafter is specifically described a process of the second determination section 25 (hereinafter referred to as "protection determining process") performed by the control unit 20. FIG. 3 is a flow diagram specifically illustrating the process of the second determination section 25. The present process is started from the time point when the TTC becomes equal to or less than the first threshold time TH1, and repeatedly performed at a cycle shorter than a determination cycle of the first determination section 23, up until the time point when the TTC exceeds the first threshold time TH1, or up until the time point when the protection devices are actuated by the vehicle control section 26.

When the present process is started, it is determined, first, at step S110, whether or not the collision speed stored in the RAM is equal to or more than a preset threshold speed. If an affirmative determination is made, control proceeds to step S120. If a negative determination is made, control proceeds to step S150. The term "threshold speed" here refers to an upper limit which is calculated such as from various experimental data, i.e. a relative speed of collision between an object, such as a pedestrian, and the vehicle concerned, which collision is of a level not injuring persons, such as the pedestrian and the vehicle occupants, involved in the collision.

At step S120, it is determined whether or not the distance between a line, including the center of the vehicle, extended in the vehicle's travel direction and an object (at a lateral position) is equal to or less than a threshold distance preset based on the width of the vehicle (i.e. whether or not the object is located at a position that would cause collision with the vehicle). If an affirmative determination is made, control proceeds to step S130. If a negative determination is made, control proceeds to step S150.

At step 130, it is determined whether or not the TTC stored in the RAM is equal to or less than the second threshold time TH2 which is preset to a value smaller than the first threshold time TH1. If an affirmative determination is made here, control proceeds to step S140. If a negative determination is made control proceeds to step S150.

The term "second threshold time TH2" refers to a preset time assuming a condition where a collision probability is at a level higher (fourth level that will be described later) than the first threshold time TH1. It should be appreciated that the second threshold time TH2 (as well as the first threshold time TH1) is calculated such as from various experimental data, on the precondition that a relative speed of collision between an object and the vehicle concerned remains unchanged at the initial speed $V_0$.

At step S140, it is determined that the collision probability corresponds to a fourth level that requires actuation of the protection devices (e.g., the pretensioners, airbags in the vehicle cabin, active grille, pop-up hood and hood airbags) provided at the vehicle to reduce injuries and damage that would be caused by the possible collision between the vehicle and an object. Then, a determination flag indicating the results of the determination is stored in the RAM (flag is set to "1") to thereby end the present process. In other words, the actuation of the ACTs 15 to 17 for the protection devices is permitted by setting a determination flag corresponding to the fourth level to "1".

On the other hand, at step S150, it is assumed that the automatic braking system will decelerate the vehicle to a level that the possible collision between an object, such as a pedestrian, and the vehicle would not cause any injuries to persons, including the pedestrian and the vehicle occupants, involved in the collision, or to a level that the possible collision between the object and the vehicle can be avoided. Then, the determination flag indicating the fourth level is set to "0" to thereby end the present process. In other words, the actuation of the ATCs 15 to 17 for the protection devices is inhibited (disabled) by setting the flag indicating the fourth level to "0".

Figure 4A:
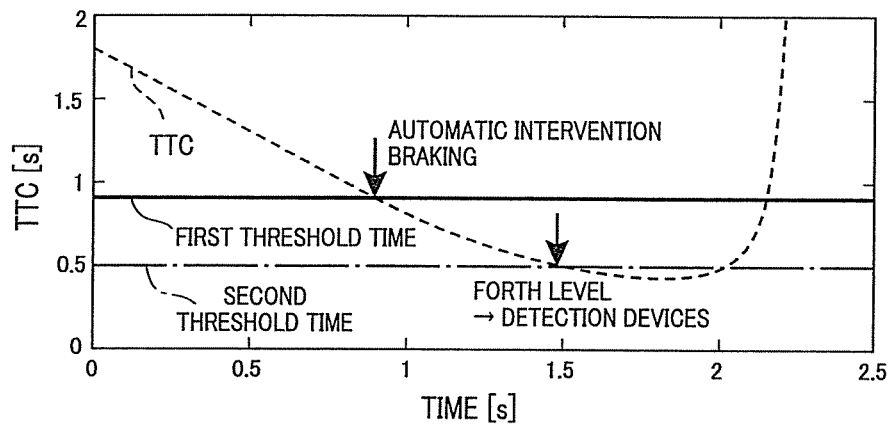
FIGS. 4A to 4C are explanatory diagrams illustrating an example of an operation of the collision injury/damage reduction apparatus.
Figure 4B:
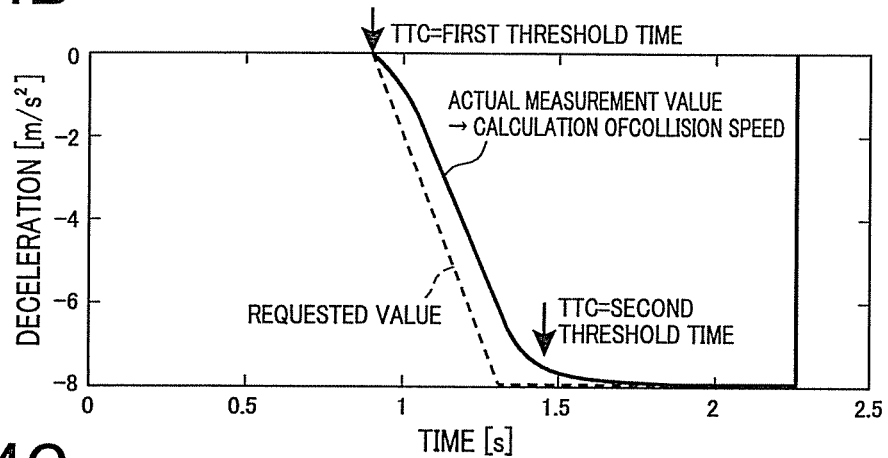
Figure 4C:
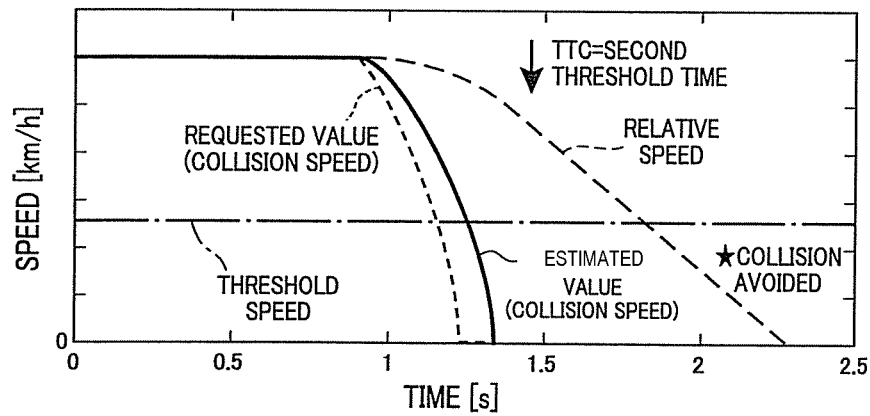
Figure 5A:
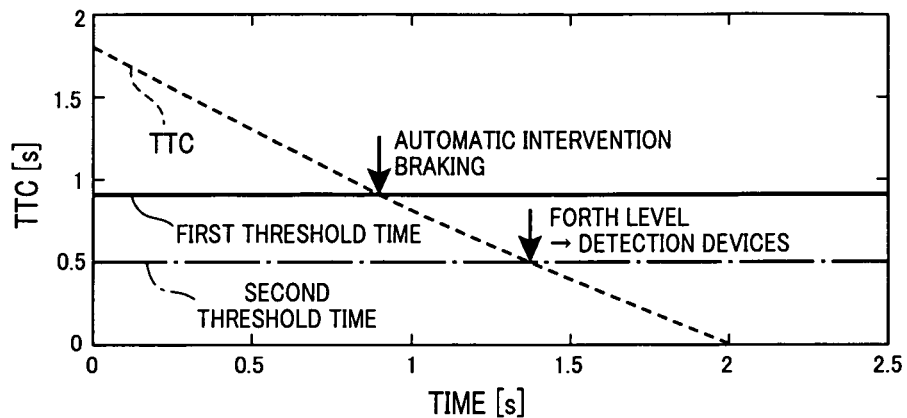
FIGS. 5A to 5C are explanatory diagrams illustrating another example of an operation of the collision injury/damage reduction apparatus.
Figure 5B:
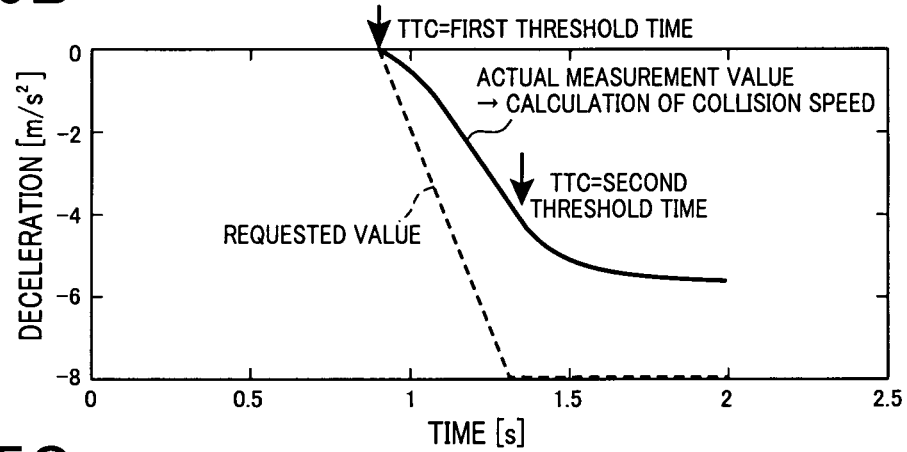
Figure 5C:
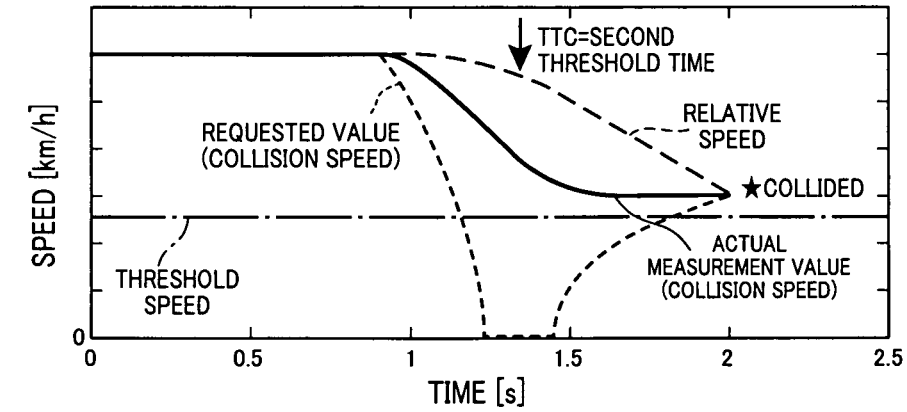

FIGS. 4A to 4C are explanatory diagrams illustrating an example of an operation of the collision injury/damage reduction apparatus 2. FIGS. 5A to 5C are explanatory diagrams illustrating another example of an operation of the collision injury/damage reduction apparatus 2.

As shown in FIGS. 4A and 5A, the collision injury/damage reduction apparatus 2 configured in this way starts operating the automatic braking system when a time to collision (TTC) becomes equal to or lower than the first threshold time (e.g., 0.9 sec). Then, when the TTC becomes equal to or less than the second threshold time (e.g., 0.5 sec), the protection devices are actuated only when the determination flag corresponding to the fourth level is set to "1".

Specifically, as shown in FIGS. 4B and 5B, the result of the detection (actual measurement value) of the acceleration sensor 12 is used as a deceleration of the vehicle caused by the automatic braking system to thereby start calculation of a collision speed that indicates a relative speed between an object and the vehicle at the occurrence of a collision. The collision speed is repeatedly calculated up until the TTC becomes equal to the second threshold time.

FIGS. 4B and 5B each show the degree of deviation in the deceleration between an actual measurement value and a requested value (target speed, deceleration gradient) set in performing the automatic intervention braking. As can be seen from these figures, the degree of deviation depends on the conditions of the road surface. For example, FIG. 5B shows the degree of deviation in the case of a wet road surface. As shown in the figure, the actual measurement value of the deceleration is deviated, on a grand scale, from the requested value.

As shown in FIGS. 4C and 5C, every time a collision speed is calculated, a preset threshold speed and the collision speed are compared. The threshold speed is, as mentioned above, a value preset as a relative speed of the collision between an object, such as a pedestrian, and the vehicle concerned, which collision is of a level not insuring persons, including the pedestrian and the vehicle occupants, involved in the collision. Then, a determination is repeatedly made regarding whether or not the collision speed is equal to or more than the threshold speed (i.e. whether or not the conditions of actuation have been met) up until the TTC becomes equal to the second threshold time.

Finally, when the TTC becomes equal to the second threshold time, the determination flag is set up based on the determination made immediately before reaching the second threshold time. Specifically, the determination flag is set to "1" if the conditions of actuation have been met, or set to "0" if the conditions of actuation have not been met. In other words, the protection devices are actuated as far as the collision speed is equal to or more than the threshold speed, when the TTC is equal to the second threshold time.

FIGS. 4A to 4C show an example that the TTC has become equal to the second threshold time (see FIG. 4A), but that the relative speed of the vehicle for an object has ultimately become zero (see FIG. 4C). Specifically, FIGS. 4A to 4C show an example that the collision between the object and the vehicle concerned has been avoided.

In this example, in the collision injury/damage reduction apparatus 2, the collision speed is lower than the threshold speed when the TTC is equal to the second threshold time. Accordingly, the protection devices do not have to be actuated. In this regard, in the technique of the conventional art, a relative speed before collision (specifically, a relative speed when the TTC is equal to the second threshold time) has been merely compared with a threshold speed without using a collision speed. With such a technique, the relative speed would have become equal to or more than the threshold speed, ending up with an erroneous actuation of the protection devices.

FIGS. 5A to 5C show an example that the TTC has become equal to the second threshold time (see FIG. 5A), and that the relative speed of the vehicle for an object has ultimately become equal to or more than the threshold speed (see FIG. 5C). Specifically, FIGS. 5A to 5C show an example that the collision between the object and the vehicle concerned has occurred.

In the technique of calculating a collision speed using an actual measurement value of deceleration, a collision speed is equal to or more than a threshold speed when the TTC is equal to the second threshold time. Accordingly, the protection devices can be correctly actuated.

In the embodiment described above, the monitoring sensor 11 corresponds to the object sensing means, the TTC calculation section 22 corresponds to the time calculating means, the first determination section 23 and the vehicle control section 26 correspond to the automatic braking means, the second determination section 25 and the vehicle control section 26 correspond to the protective actuating means, the speed estimation section 24 corresponds to the speed estimating means, and the acceleration sensor 12 corresponds to the acceleration sensing means.

As described above, the collision injury/damage reduction apparatus 2 of the present embodiment starts operation of the automatic braking system when a time to collision (TTC) becomes equal to the first threshold time. At the same time, the collision injury/damage reduction apparatus 2 starts calculation (estimation) of a relative speed (collision speed), taking into consideration the deceleration of the vehicle caused by the automatic braking system. Then, the protection devices are actuated as far as the collision speed is equal to or more than a threshold speed when the TTC is equal to the second threshold time.

Thus, according to the collision injury/damage reduction apparatus 2 of the present embodiment, a threshold determination is made using a collision speed that is an estimated a relative speed at the time of occurrence of a collision. Therefore, the results of the determination match the actual behavior (travel status) of the vehicle. Moreover, the collision injury/damage reduction apparatus 2 enables an accurate determination, immediately before the collision between an object and the vehicle, regarding whether or not the protection devices should be actuated. Accordingly, the probability of erroneous actuation of the protection devices can be reduced.

Further, the collision injury/damage reduction apparatus 2 calculates a collision speed using the result of detection (actual measurement value of deceleration) derived from the acceleration sensor 12. Thus, if an actual measurement value is deviated from a requested value due to the road surface conditions, the collision injury/damage reduction apparatus 2 enables calculation of a collision speed that matches the actual travel status of the vehicle. In this way, reliability of the collision speed can be enhanced.

In addition, in the collision injury/damage reduction apparatus 2, the estimation cycle (i.e., estimation intervals) of a collision speed performed by the speed estimation section 24 is set to be shorter than the calculation cycle (i.e., calculation intervals) of a TTC performed by the TTC calculation section 22. Thus, the collision injury/damage reduction apparatus 2 enables repeated calculation of a collision speed from when the TTC becomes equal to the first threshold time up until when the TTC becomes equal to the second threshold time. In this way, an accurate determination can be made without delay, regarding whether or not the conditions of actuation have been met at the time point when the TTC becomes equal to the second threshold time.

MODIFICATIONS

The present invention is not limited to the embodiment described above, but may be implemented in various modes within a scope not departing from the spirit of the present invention.

For example, in the TTC calculation section 22 of the above embodiment, a time to collision (TTC) has been calculated based on the target information derived from the radar sensor 19. Alternative to this, however, the TTC may be calculated by calculating a relative distance and a relative speed between an object and the vehicle concerned based on the image data derived from the image sensor 18. In other words, the collision injury/damage reduction apparatus 2 may only have to include, as the monitoring sensor 11, either one of the image sensor 18 and the radar sensor 19.

Also, in the object selection section 21 of the above embodiment, a forecast travel trajectory has been calculated based on the results of detection of the speed sensor 14 and the yaw rate sensor 13. However, a forecast travel trajectory does not have to be necessarily calculated. For example, objects located in a travel direction of the vehicle may be extracted only based on the target information derived from the radar sensor 19 (or the image data derived from the image sensor 18). In other words, the collision injury/damage reduction apparatus 2 does not have to be necessarily provided with the speed sensor 14 and the yaw rate sensor 13.

Further, in the vehicle control section 26 of the above embodiment, the pretensioners have been ensured to be actuated when the level of a collision probability is the third level, and the airbags in the vehicle cabin, the active grille, the pop-up hood and the hood airbags (airbags for pedestrians)

have been ensured to be actuated when the level of a collision probability is the fourth level. However, this is not necessarily the case.

For example, when the level of a collision probability is the third level, the pretensioners may not be actuated, but instead, the protection devices operable reversibly (pretensioners, active grille and pop-up hood), which are to be actuated at the fourth level, may be actuated. The expression "the protection devices operable reversibly" refers to the protection devices which are able to effect actuation for restoration into the original state without requiring reinstallation of the devices, should the devices be actuated when unwanted.

In this case, the protection devices which are operable irreversibly (airbags in the vehicle cabin, airbags for pedestrians) (i.e. those devices which cannot be reversely actuated) may be ensured to be actuated when an actual collision has been detected from the results of detection such as of the acceleration sensor 12.

Specifically, the airbags in the vehicle cabin and the airbags for pedestrians may be actuated only when the acceleration sensed (measured) by the acceleration sensor 12, which is also used as the collision measuring means, is equal to or more than a reference acceleration that indicates the collision between the vehicle concerned and an object.

It should be appreciated that the acceleration sensor 12, or the collision measuring means, may be replaced by a pressure sensor which, for example, measures pressure applied to the front part of the vehicle.

Figure 6:
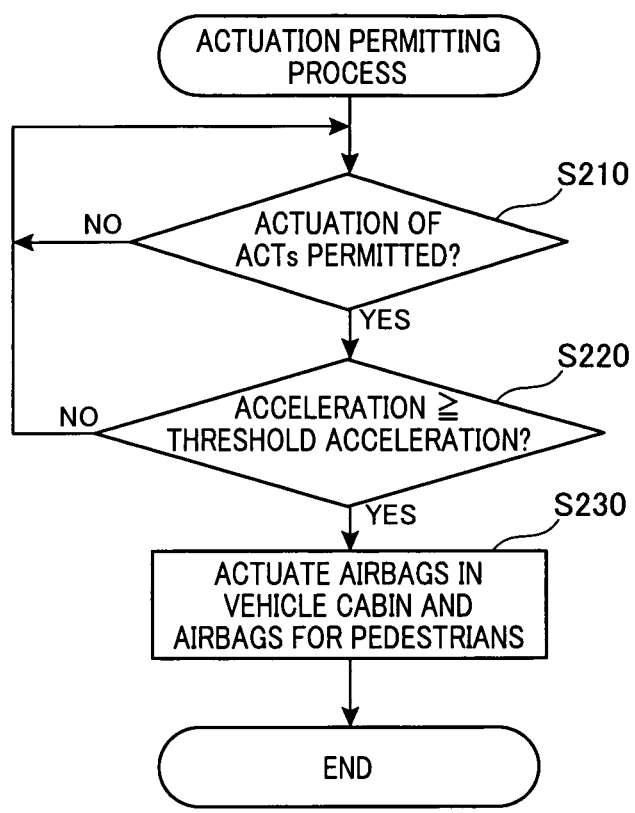
FIG. 6 is a flow diagram specifically illustrating an actuation permitting process performed by the control unit, according to a modification of the embodiment.

Alternatively, the timing of actuation may be changed for the protection devices which are operable irreversibly. This will be explained referring to a flow diagram of FIG. 6 illustrating an actuation permitting process performed by the control unit 20. As shown in FIG. 6, it is determined, at step S210, whether or not the actuation of the ACTs should be permitted. If an affirmative determination is made to actuate the ATCs (as is done at step S140 in the protection determining process described above), it is determined, at step S220, whether or not an acceleration measured by the acceleration sensor 12 is equal to or more than a threshold acceleration preset to a value smaller than a reference acceleration. Only when an affirmative determination is made at step S220, the control unit 20 actuates, at step S230, the airbags in the vehicle cabin and the airbags for pedestrians (this corresponds to the actuation permitting means).

In this case, regarding the protection devices normally actuated at the time of occurrence of a collision (i.e. protection devices operable irreversibly) as well, a threshold determination is made using the threshold acceleration smaller than the normal threshold (reference acceleration), as to whether or not these devices should be actuated, provided that these devices meet the conditions of actuation, for example, associated with the protection devices actuated prior to a collision (i.e. protection devices operable reversibly). Thus, the timing of actuation of the protection devices operable irreversibly can be put forward, under the condition where the injuries and damage that would be caused by the collision are expected to be large. In this way, collision injuries and damage can be reduced more in line with the travel status of the vehicle.

In the speed estimation section 24 of the above embodiment, Formula (I) has been used in calculating the collision speed V. Alternatively, the following Formula (II) may be used.

$$V = V_0 + \alpha \cdot TTC \quad (II)$$

In the protection determining process of the above embodiment, reconfirmation has been made (step S120) based on the target information derived from the radar sensor 19, as to whether or not an object is located at a position where the object would collide with the vehicle. However, this is not necessarily the case. For example, the present process may be ensured not to be started until an object (e.g., a pedestrian) located within a predetermined range is extracted by the object selection section 21, omitting step S120.

What is claimed is:

1. An apparatus for reducing damage from collisions, the apparatus being mounted on a vehicle provided with a protection device and a braking device, the apparatus comprising:

a first detector detecting an object which is present in a field in a travel direction of the vehicle;

a time estimator estimating, repeatedly, at first time intervals, a time to collision (TTC) on the basis of results detected by the first detector, the time to collision being defined as a ratio of a relative distance between the object and the vehicle to a relative speed between the object and the vehicle;

a braking controller activating the braking device to perform automatic intervention braking of the vehicle at a time when the time to collision detected by the time estimator is equal to or shorter than a first threshold time;

a second detector detecting a deceleration of the vehicle;

a speed estimator starting to estimate, repeatedly, at second time intervals, a collision speed of the vehicle on the basis of the deceleration detected by the second detector at the time when the time to collision detected by the time estimator becomes equal to or shorter than the first threshold time, wherein the collision speed being defined as a vehicle speed estimated under an assumption that the time to collision would become zero which means a collision between the vehicle and the object, the second time intervals being shorter than the first time intervals;

a determination unit determining, every time when the collision speed is estimated, i) whether or not the time to collision is equal to or shorter than a second threshold time, the second threshold time being shorter than the first threshold time; and ii) whether or not the collision speed estimated by the speed estimator is equal to or higher than a preset threshold speed; and a protection controller activating the protection device when the determination unit determines that the time to collision is equal to or shorter than the second threshold time and determines that the collision speed is equal to or higher than the preset threshold speed.

2. The apparatus of claim 1, wherein the speed estimator estimates the collision speed V on the basis of the following formula:

$$V^2 - V_0^2 = 2\alpha X_0$$

where the relative speed is $V_0$, the relative distance is $X_0$, and the deceleration is $\alpha$ (<0), wherein the relative speed $V_0$ and the relative distance $X_0$ are based on the result detected by the detector.

3. The apparatus of claim 2, wherein the protection device is operable reversibly.

4. The apparatus of claim 2, wherein the protection device is operable irreversibly, the apparatus comprising:

a sensor that measures a physical value to sense a collision between the vehicle and the object; and a control device that allows the protection controller to make the protection device active only when the detected physical value measured by the sensor is equal to or higher than a threshold which is preset to be smaller than a reference physical value with respect to the collision.

5. The apparatus of claim 1, wherein the protection device is operable reversibly.

6. The apparatus of claim 1, wherein the protection device is operable irreversibly, the apparatus comprising:

a sensor that measures a physical value to sense a collision between the vehicle and the object; and a control device that allows the protection controller to make the protection device active only when the detected physical value measured by the sensor is equal to or higher than a threshold which is preset to be smaller than a reference physical value with respect to the collision.

7. The apparatus of claim 1, wherein the speed estimator estimates the collision speed of the vehicle only when the time to collision becomes equal to or shorter than the first threshold time.

* * * * *